April 24, 1962     E. ENGHOFER     3,030,866

MILLING METHOD

Filed March 28, 1960

INVENTOR
EMIL ENGHOFER

BY *Stevens, Davis, Miller & Mosher*

ATTORNEYS

United States Patent Office 3,030,866
Patented Apr. 24, 1962

3,030,866
MILLING METHOD
Emil Enghofer, Pforzheim, Germany, assignor to Strausak & Cie. Maschinenfabrik und Apparatebau Lohn, Solothurn, Switzerland
Filed Mar. 28, 1960, Ser. No. 17,939
Claims priority, application Switzerland Apr. 6, 1959
5 Claims. (Cl. 90—4)

My present invention relates to improvements in the method of milling, known per se, in which a face on a workpiece is rough-milled in a conventional milling operation and finished in a climb milling operation in an additional passage, both while using a formed cutter, a side milling cutter or a hob.

Figure 1:
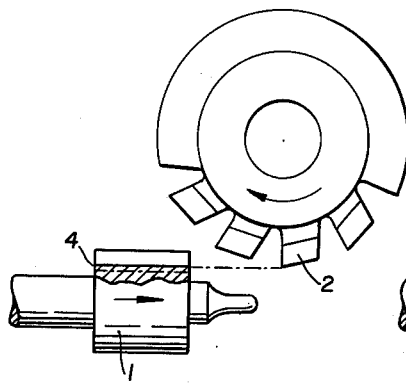
Figure 2:
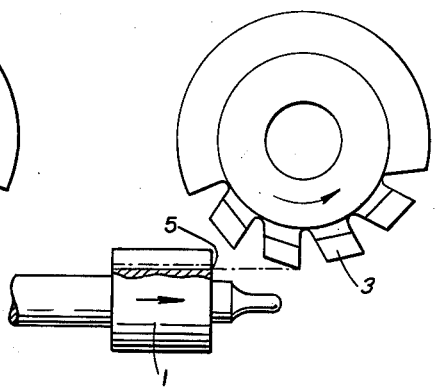

In FIGS. 1 and 2 of the drawing is shown how so far one has proceeded, for example, when hobbing the drives of watch movements such as 1 while using a stocking cutter 2 and a finishing cutter 3. The direction of feed of the work 1 when roughing (FIG. 1) is the same as when finishing (FIG. 2). In the roughing operation, fins 4 are produced on the rear face of the work. These fins disappear in the finishing operation; in return for which, however, are produced fins 5 on the frontface of the work in finishing. A subsequent machining operation is indispensable for removing the fins 5.

The invention aims to prevent the formation of fins when finishing so as to dispense with any additional machining operation for removing same.

As disclosed by my present invention, such aim shall be materialized by letting, in the operation of roughing, the cutter on the work entry side penetrate to such depth into the work that no material remains there for the finishing operation. The depth of milling then is decreased by the thickness of material provided for the finishing operation. The roughing operation is continued while the depth of milling remains constant, and the roughing operation is terminated. The finishing operation is carried out with the same sense of feed with respect to the tool as in the roughing operation. All of these steps serve for the purpose of avoiding the formation of fins both on the entry end and on the exit end of the work.

Figure 3:
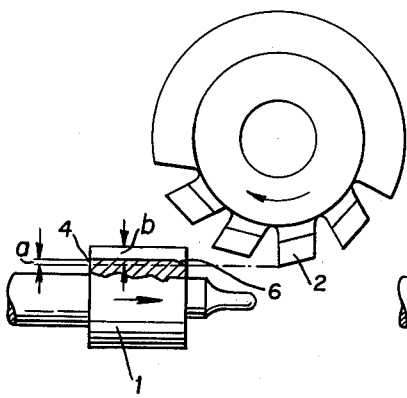
Figure 4:
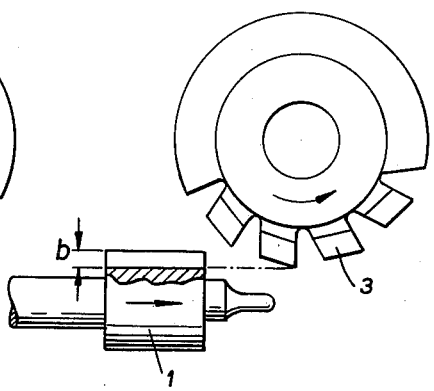

The method disclosed by my present invention is explained, by way of example, with the aid of FIGS. 3 and 4 of the drawing. In the drawing, FIGS. 1 and 2 show schematically, as mentioned above, the known method of rough-milling and finish-milling respectively; and FIGS. 3 and 4 illustrate the new method, being respectively analogous to FIGS. 1 and 2.

The example shown again relates to the hobbing of watch-movement gears 1 while using the same stocking cutter 2 and the same finishing cutter 3 as in the conventional example illustrated in FIGS. 1 and 2. As in the conventional method, the direction of feed of work 1 when roughing is the same as when finishing, and the sense of rotation of the cutters 2, 3 is identical to that of the conventional method, the stocking cutter 2 rotating clockwise and the finishing cutter 3 rotating counterclockwise.

FIG. 1 shows the rough-milled work. It is to be seen that when roughing, cutter 2 at the work entry side penetrates to such depth into the work 1 that at that point 6 no material is left for finishing. The depth of milling then is decreased by the amount $a$, i.e. the thickness of material contemplated for finishing, which suitably and conventionally is from 10% to 30% of the depth of tooth $b$. Roughing then is continued with the same milling depth and terminated, fins 4 being formed on the work rear face just as in the conventional method in FIG. 1. The finishing operation then is carried out, as shown in FIG. 4, the direction of feed of work 1 with respect to the cutter being identical to that while roughing. In FIG. 4 is shown the finished work in which the fins 4 disappear as soon as the finishing cutter 3 when climbing engages the rear end face of work 1. When cutter 3 emerges from the work frontface, fins 5 (FIG. 2) are lacking, since no material is left or present there from which such fins could be formed.

To carry out automatically the improved milling method disclosed by my invention, no substantial additional expenditure is required. So far already a machine part or portion carrying the tool spindle has been raised in the work return motion, both in roughing and in finishing, which part or portion in the work forward motion and through the agency of a screw adjustable thereon, will engage or mount a stationary stop, one such screw and one such stop being associated with each of the two cutters 2 and 3. It now suffices, for example, to attach a cam member to the work slide parallel to the direction of movement of the latter, which member when rough-milling is supported on the respective stop (which however could be left out). Said cam member on its upper side is provided with two bearing areas parallel to the direction of movement of the slide and an intermediate oblique area. The latter causes the stocking cutter 2 to be slightly raised by the amount $a$ of the thickness of material provided for the finishing operation, as soon as the cutter 2 at 6 has penetrated into the work for the full tooth depth.

It will be readily seen that the method disclosed by the present invention may be usefully employed not only for hobbing but also for any other milling operation of the initially mentioned type in which is used a forming or side-milling cutter or hob.

I claim:

1. In the method of milling in which a work face is rough-milled in the conventional milling manner and is finished in an additional passage while climb-milling, both operations being carried out by means of a milling cutter, the improvement defined by the steps of letting the cutter in the operation of rough-milling penetrate into the work to such depth on the work entry side that no material is left there for the finishing operation, then decreasing the depth of milling by the amount of the material thickness provided for the finishing operation, continuing the rough-milling operation at a constant milling depth and terminating such operation, and carrying out the finishing operation with the same sense of work-feed with respect to the cutter as in the roughing operation but reverse rotation of the cutter; the whole purpose being to avoid the formation of a burr.

2. A milling method as set out in claim 1 for hobbing work, in which the material left for the finishing operation while roughing amounts to from 10 to 30% of the tooth depth.

3. A method of milling a work piece to eliminate the formation of a burr at each end of the work piece comprising the step of taking a rough milling cut from one end of the work piece to the other with the rough milling cut at the one end of the work piece being to the required finish cut depth and tapering upwardly to the customary rough cut depth, and then taking a finish cut at the finish cut depth.

4. The method of claim 3 wherein rotary milling tools are used with the direction of rotation of the rotary tool for the rough cut being in the opposite direction from the rotation of the rotary tool for the finish cut.

5. The method of claim 4 wherein the direction of relative feed between the work piece and the rotary tools is the same.

References Cited in the file of this patent
UNITED STATES PATENTS

| | | |
|---|---|---|
| 1,897,032 | Ernst | Feb. 14, 1933 |
| 2,397,086 | Brady | Mar. 26, 1946 |
| 2,908,201 | Hellberg | Oct. 13, 1959 |

FOREIGN PATENTS

| | | |
|---|---|---|
| 1,191,942 | France | Apr. 13, 1959 |